US 6,741,583 B1

(12) United States Patent
Klein et al.

(10) Patent No.: US 6,741,583 B1
(45) Date of Patent: May 25, 2004

(54) TELECOMMUNICATION SYSTEM FOR WIRELESS TELECOMMUNICATION WITH A CDMA, FDMA, AND TDMA MULTIPLE ACCESS COMPONENT

(75) Inventors: Anja Klein, Berlin (DE); Markus Nasshan, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,313

(22) PCT Filed: Oct. 6, 1998

(86) PCT No.: PCT/DE98/02959
§ 371 (c)(1),
(2), (4) Date: Apr. 27, 1999

(87) PCT Pub. No.: WO99/22474
PCT Pub. Date: May 6, 1999

(30) Foreign Application Priority Data

Oct. 27, 1997 (DE) .......................... 197 47 370

(51) Int. Cl.$^7$ .............................................. H04B 7/216
(52) U.S. Cl. .................................................... 370/342
(58) Field of Search ................................ 370/335, 337, 370/350, 328, 206, 319, 320, 280, 321, 314, 330, 332, 342, 343, 344, 347, 503

(56) References Cited

U.S. PATENT DOCUMENTS

| 5,481,533 | A | * | 1/1996 | Honig et al. | 370/335 |
| 5,539,730 | A | * | 7/1996 | Dent | 370/280 |
| 5,648,967 | A | * | 7/1997 | Schulz | 370/328 |
| 5,793,757 | A | * | 8/1998 | Uddenfeldt | 370/335 |

FOREIGN PATENT DOCUMENTS

WO  WO 93/21719  10/1993

OTHER PUBLICATIONS

Tero Ojanpera et al., "Frames–Hybrid Multiple Access Technology", IEEE International Symposium on spread Spectrum Techniques & Application, (1996), pp. 320–324.
Nachrichtentech, Elektronik, Berlin 45, (1995), P.Jung et al., Konzept eines CDMA–Mobilfunksystems mit gemeinsamer Detektion für die dritte Mobilfunkgeneration, Teil 1, pp. 10–14 and Teil 2, pp. 24–27.
IEEE Communications Magazine, Jan. 1995, David D. Falconer et al, Time Division Multiple Access Methods for Wireless Personal Communications, pp. 50–57.
Nachrichtentech, Elektronik, Berlin 41, (1991), Baier et al., "CDMA —ein günstiges Vielfachzugriffs–verfahren für frequenzselektive und zeitvariante Mobilfunkkanäle", pp. 223–227 & 234.
IEICE Transactions on Fundamentals of Electronics, Communications and Computer Sciences, vol. E79–A, No. 12, (1996), Baier, et al., "CDMA Myths and Realities Revisited", pp. 1930–1937.
IEEE Personal Communications, (1995), Urie, et al., "An Advanced TDMA Mobile Access Systems for UMTS", pp 38–47.
Telekom praxis, May 1995, Baier, "Spread–Spectrum–Technik und CDMA—eine ursprünglich militärische Technik erobert den zivilen Bereich", pp. 9–14.
IEEE Personal Communications, (1995),Andermo et al., "An CDMA–Based Radio Access Design for UMTS",pp. 48–53.

(List continued on next page.)

Primary Examiner—Chi Pham
Assistant Examiner—Alexander O. Boakye
(74) Attorney, Agent, or Firm—Staas & Halsey LLP

(57) ABSTRACT

The invention relates to a telecommunication system wherein the known multi-code option is used in downlink (direction of transmission: base station to mobile station) and the known multi-slot option is used in upink (direction of transmission: mobile station to base station).

4 Claims, 6 Drawing Sheets

OTHER PUBLICATIONS

Figure 1:
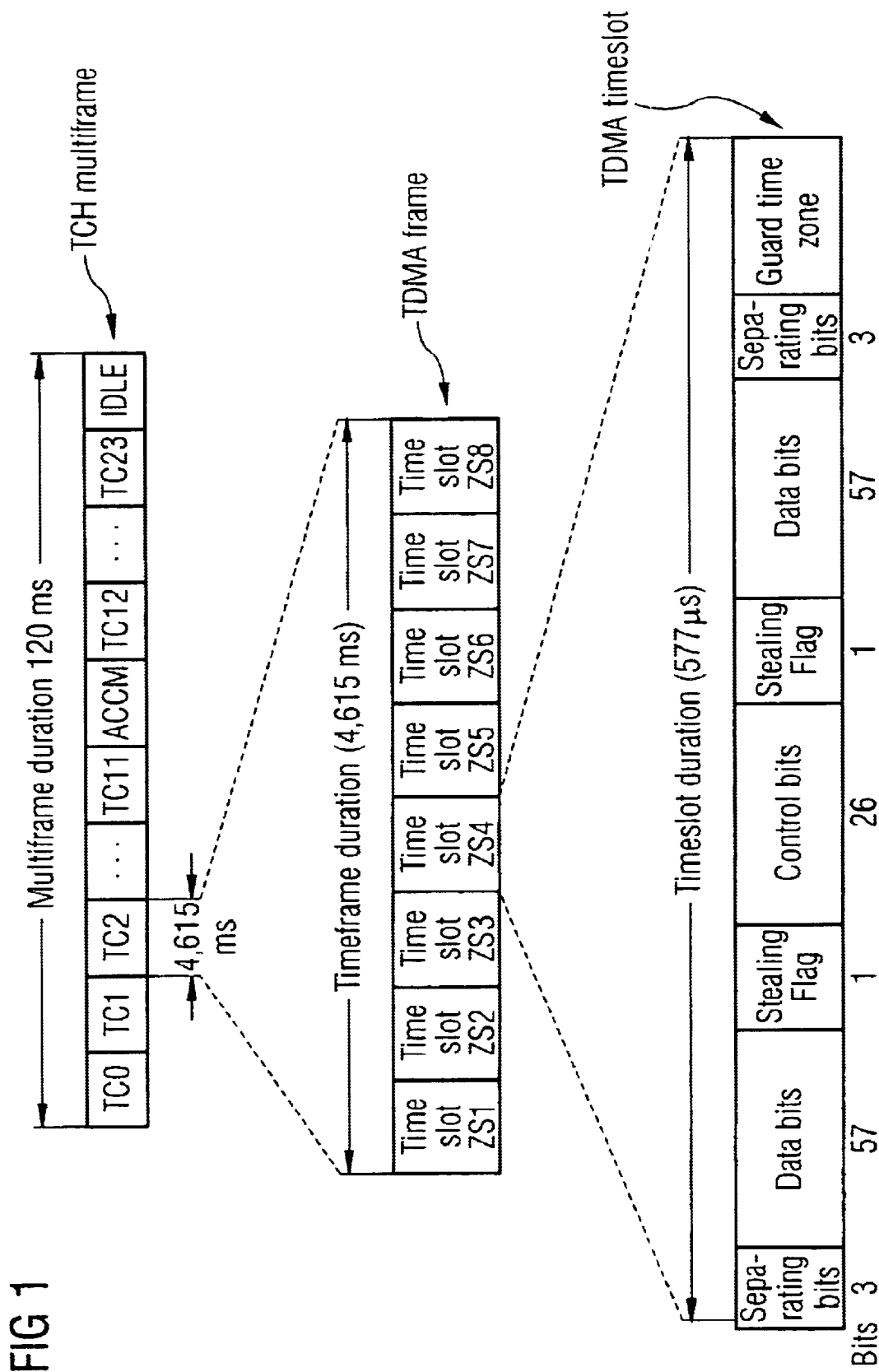

ITG Fachberichte 124 (1993) Berlin Offenbach: VDE Verlag ISBN 3-8007-1965-7, pp. 67–75; Dr. T. Zimmermann, Siemens AG: "Anwendung von CDMA in der Mobikommunikation".

Telcom report 16, (1993) Heft 1, pp. 38–41, Dr. T. Ketseoglou, siemens AG and Dr. T. Zimmermann, Siemens Ag: "Effizienter Teilnehmerzugriff für die 3. Generation der Mobilkommunikation—Vielfachzugriffsverfahren CDMA macht Luftschnittstelle flexibler".

Informatik Spektrum 14, Jun. 1991, No. 3, Berlin, A. Mann, "Der GSM-Standard—Grundlage für dugutake europäische Mobilfunknetze", pp. 137–152.

R. Steele, "Mobile Radio Communications", Pentech Press, (1992) Chapter 8: The Pan-European digital Cellular Mobile Radio system—known as GSM, pp. 691–695.

Telkom praxis Apr. 1993, P. Smolka: "GSM-Funkschnittstelle—Elemente und Funktionen", pp. 17 & 24.

DECT/GAP standard (Digital European Cordless Telecommunication; cf. (1): Nachrichtentechnik Elektronik 42 (1992) Jan./Feb. No.1, Berlin, DE; U. Pilger "Struktur des DECT-Standards," pp. 23–29.

Telecom Report 16 (1993), No. 1, J. H. Koch: "Digitaler Komfort für schnurlose Telekommunikation—DECT-Standard eröffnet neue Nutzungsgebiete", pp. 26–27.

Tec 2/93—Das technische Magazin von Ascom "Wege zur universellen mobilen Telekommunikation", pp. 35 to 42.

Philips Telecommunication Review, R. J. Mulder, "DECT, a universal cordless access system", pp. 68–73.

ETSI—Publication, Oct. 1992, ETS 300175 1 . . . 9, Part 1: Overview, pp. 1–30; Part 2: Physical layer, pp. 1–39; Part 3: Medium access control layer, pp. 1–197; Part 4: Data link control layer, pp. 1–128; Part 5: Network layer, pp. 1–241; Part 6: Identifies and addressing, pp. 1–41; Part 7: Security features, pp. 1–104; Part 8: Speech coding and transmission, pp. 1–39; Part 9: Public access profile, pp. 1–71.

* cited by examiner

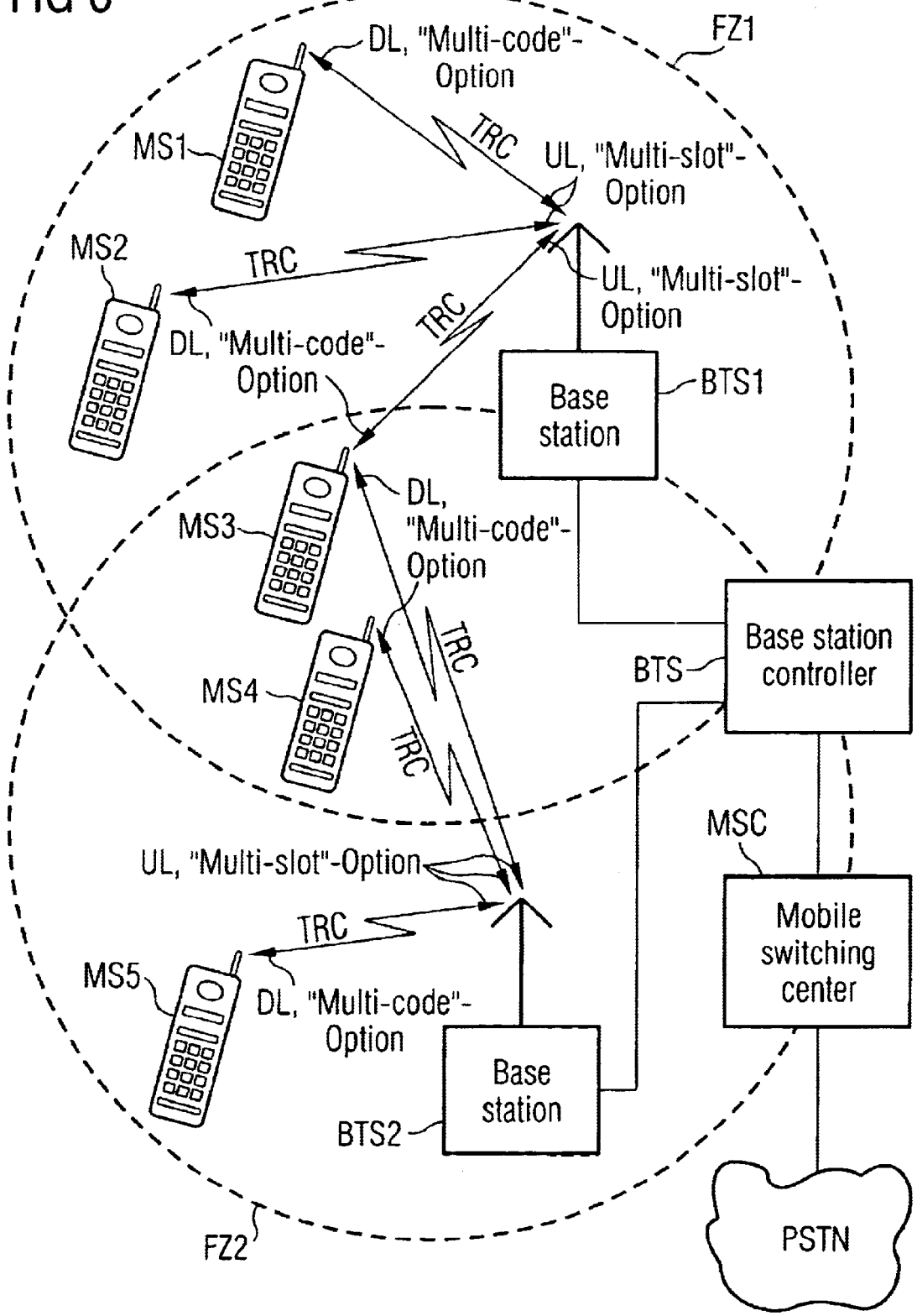

TELECOMMUNICATION SYSTEM FOR WIRELESS TELECOMMUNICATION WITH A CDMA, FDMA, AND TDMA MULTIPLE ACCESS COMPONENT

Transmitting and receiving appliances (transmitters and receivers) are used in message systems having a message transmission path between a message source and a message sink for message processing and transmission, in which appliances 1) the message processing and message transmission can take place in a preferred transmission direction (simplex operation) or in both transmission directions (duplex operation),
2) the message processing is analog or digital,
3) the message transmission via the long-distance transmission path is wire-based or is carried out without wires (for example by radio transmission) on the basis of various message transmission methods FDMA (Frequency Division Multiple Access), TDMA (Time Division Multiple Access) and/or CDMA (Code Division Multiple Access)—for example in accordance with radio standards such as DECT, GSM, WACS or PACS, IS-54, IS-95, PHS, PDC etc. [see IEEE Communications Magazine, January 1995, pages 50 to 57; D. D. Falconer et al.: "Time Division Multiple Access Methods for Wireless Personal Communications"].

"Message" is a generic term which covers both the content (information) and the physical representation (signal). Despite a message having the same content—that is to say the same information different signal forms may occur. Thus, for example, a message relating to one item may be transmitted (1) in the form of a picture,
(2) as the spoken word,
(3) as the written word,
(4) as an encrypted word or picture. transmission type in (1) . . . (3) is in this case normally characterized by continuous (analog) signals, while the transmission type in (4) normally consists of discontinuous signals (for example pulses, digital signals).

Based on this general definition of a message system, the invention relates to a method for wire-free telecommunication, in particular having a CDMA, FDMA and TDMA multiple access component as claimed in the precharacterizing clause of patent claim 1.

Methods for wire-free telecommunication are used in telecommunications systems as are presented and described in the following documents (1): *Nachrichtentechnik Elektronik* [*Electronic information technology*], Berlin 45, 1995, Issue 1, pages 10 to 14 and Issue 2, pages 24 to 27; P. Jung, B. Steiner: "Konzept eines CDMA-Mobilfunksystems mit gemeinsamer Detektion fur die dritte Mobilfunkgeneration" [Concept of a CDMA mobile radio system with joint detection for the third generation]; (2): *Nachrichtentechnik Elektronik* [*Electronic information technology*], Berlin 41, 1991, Issue 6, pages 223 to 227 and page 234; P. W. Baier, P. Jung, A. Klein: "CDMA—ein günstiges Vielfachzugriffsverfahren für frequenzselektive und zeitvariante Mobilfunkkanäle" [CDMA—a useful multiple-access method for frequency-selective and time-variant mobile radio channels]; (3): IEICE Transactions on *Fundamentals of Electonics, Communications and Computer Sciences*, Vol. E79-A, No. 12, December 1996, pages 1930 to 1937; P. W. Baier, P. Jung: "*CDMA Myths and Realities Revisited*"; (4): IEEE Personal Communications, February 1995, pages 38 to 47; A. Urie, M. Streeton, C. Mourot: "*An Advanced TDMA Mobile Access System for UMTS*"; (5): telekom praxis, 5/1995, pages 9 to 14; P. W. Baier: "Spread-Spectrum-Technik und CDMA—eine ursprünglich militärische Technik erobert den zivilen Bereich" [Spread spectrum technology and CMDA—an originally military technology takes over the civil area]; (6): IEEE Personal Communications, February 1995, pages 48 to 53; P. G. Andermo, L. M. Ewerbring: "*An CDMA-Based Radio Access Design for UMTS*"; (7): ITG Fachberichte [*ITG Specialist Reports*] 124 (1993), Berlin, Offenbach: VDE Verlag ISBN 3-8007-1965-7, pages 67 to 75; Dr. T. Zimmermann, Siemens AG: "Anwendung von CDMA in der Mobilkommunikation," [*Use of CDMA for mobile communication*]; (8): telcom report 16, (1993), Issue 1, pages 38 to 41; Dr. T. Ketseoglou, Siemens AG und Dr. T. Zimmermann, Siemens AG: "Effizienter Teilnehmerzugriff für die 3. Generation der Mobilkommunikation—Vielfachzugriffsverfahren CDMA macht Luftschnittstelle flexibler" [Efficient subscriber access for 3rd generation mobile communication—multiple-access methods CDMA makes the radio interface more flexible], are referred to as the future third-generation radio telecommunications scenario, based on the prospect of a Universal Mobile Telecommunications System (UMTS).

The second generation radio telecommunications scenario are currently governed, in the microcell and macrocell area, by the GSM-specific radio telecommunications system based on the FDMA/TDMA/FDD transmission principle (Frequency Division Duplex) [Global System for Mobile Communication; see (1): Informatik Spektrum [Information technology spectrum] 14 (1991) June, No. 3, Berlin, DE; A. Mann: "Der GSM-Standard—Grundlage für digitale europäische Mobilfunknetze" [The GSM Standard—the basis for digital European mobile radio networks], pages 137 to 152; (2): R. Steele: Mobile Radio Communications, Pentech Press, 1992 (Reprint 1994), Chapter 8: The Pan-European Digital Cellular Mobile Radio System—known as GSM, pages 677 ff.; (3): telekom praxis 4/1993, P. Smolka: "GSM-Funkschnittstelle—Elemente und Funktionen" [GSM radio interface—elements and functions], pages 17 and 24] and, in the picocell area, by the DECT telecommunications system based on the FDMA/TDMA/TDD transmission principle (Time Division Duplex) [Digital Enhanced (previously: European) Cordless Telecommunication; see (1): Nachrichtentechnik Elektronik [Electronics information technology] 42 (1992) January/February No. 1, Berlin, DE; U. Pilger "Struktur des DECT-Standards" [Structure of the DECT Standard], pages 23 to 29 in conjunction with ETSI Publication ETS 300175-1 . . . 9, October 1992; (2): telecom report 16(1993), No. 1, J. H. Koch: "Digitaler Komfort für schnurlose Telekommunikation—DECT-Standard eröffnet Nutzungsgebiete" [Digital convenience, for cordless telecommunications—the DECT Standard opens up new fields of use], pages 26 and 27; (3): tec 2/93—The technical magazine from Ascom "Wege zur universellen mobilen Telekommunikation" [Approaches to universal mobile telecommunications], pages 35 to 42; (4): Philips Telecommunication Review Vol. 49, No. 3, September 1991, R. J. Mulder: "DECT, a universal cordless access system"; (15): WO 93/21719 (FIGS. 1 to 3 with corresponding description)]

FIG. 1 shows the TCH multiframe, TDMA frame and TDMA timeslot structures for the GSM mobile radio concept which is known for user data transmission on the traffic channel (Traffic Channel TCH) from the documents "(1): Inforrmatik Spectrum [Information technology spectrum] 14 (1991) June, No. 3, Berlin, DE; A. Mann: "Der GSM- Standard—Grundlage für digitale europäische Mobilfunknetze" [The GSM Standard—The basis for digital European modile radio networks], pages 137 to 152; (2): R. Steele: Mobile Radio Communications, Pentech Press, 1992 (Reprint 1994), Chapter 8: The Pan-European Digital Cellular Mobile Radio System—known as GSM, pages 677 ff.; (3): telekom praxis 4/1993, P. Smolka: "GSM-Funkschnittstelle—Elemente und Funktionen" [GSM radio interface—elements and functions], pages 17 and 24", in which the data embedded in the described structure and having a time slot duration of 577 µs are transmitted using the FDD principle in the uplink path or uplink direction (uplink; "mobile station→base station" transmission) in the frequency band between 890 MHz and 915 MHz and in the downlink path or downlink direction (downlink; "base station→mobile station" transmission) in the frequency band between 935 MHz and 960 MHz.

Figure 2:
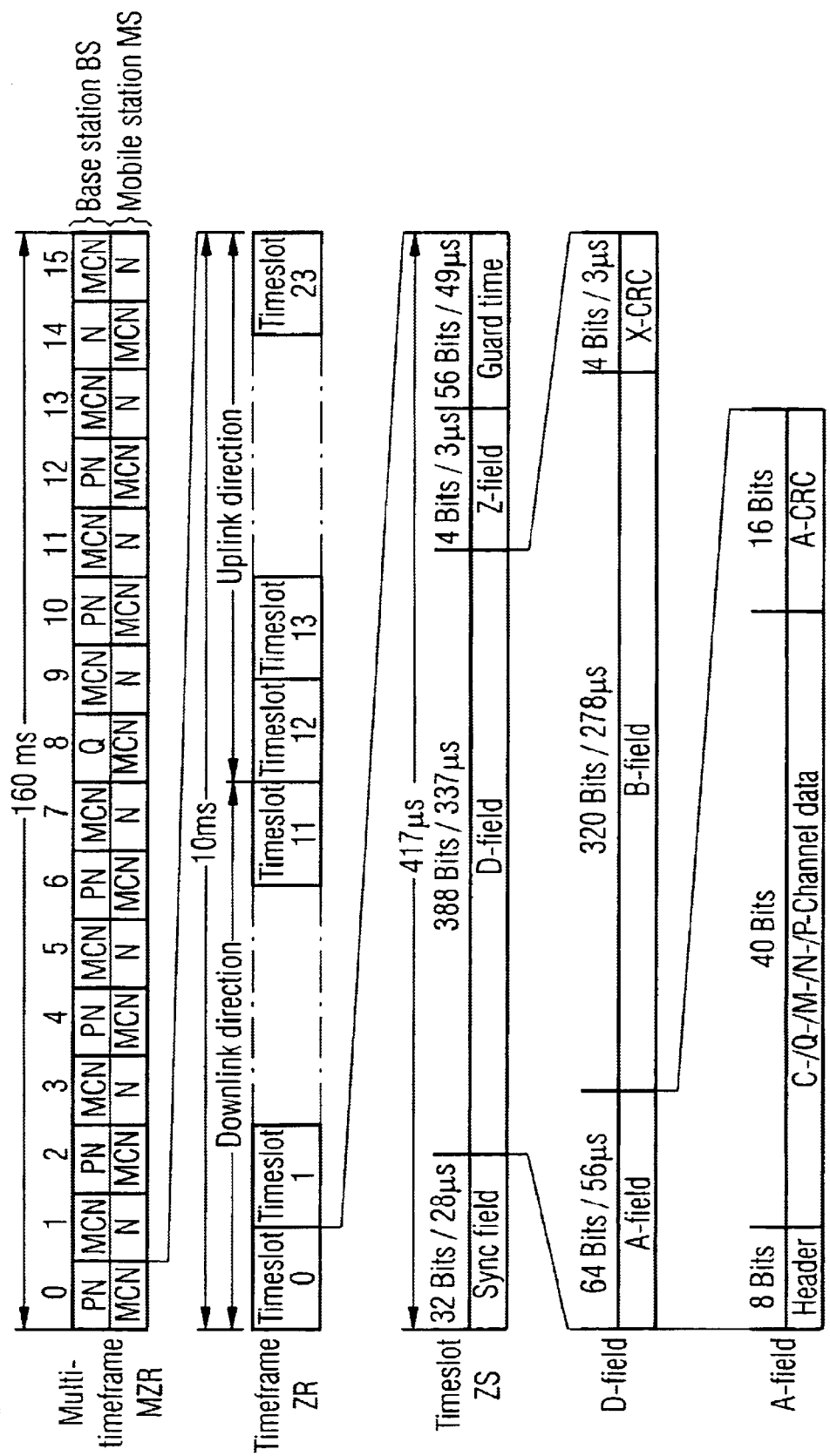

FIG. 2 shows the multiframe, TDMA frame and TDMA timeslot structures of the DECT mobile radio concept which is known from the document "Nachrichtentechnik Elektronik [Electronics information technology] 42 (1992) January/February, No. 1, Berlin, DE; U. Pilger "Struktur des DECT-Standards" [Structure of the DECT Standard], pages 23 to 29", in which the data embedded in the described structure are transmitted, using the TDD principle, in the timeslots 0 . . . 11 in the downlink path or downlink direction (downlink; "base station→mobile station" transmission), and in the timeslots 12 . . . 23 in the uplink path or uplink direction (uplink; "mobile station base station" transmission).

Figure 3:
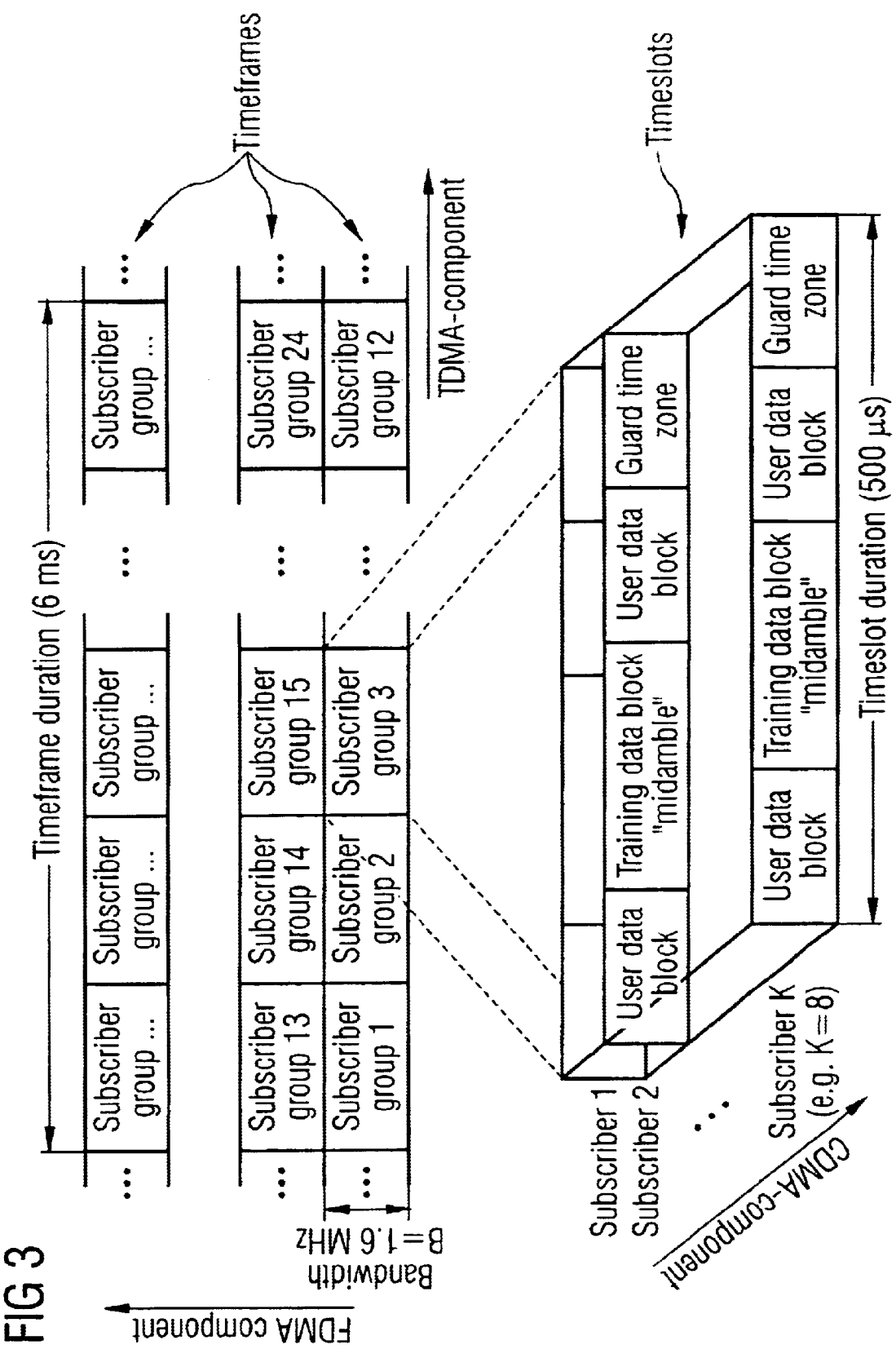

Based on the document *Nachrichtentechnik Elektronik* [*Electronics information technology*], Berlin 45, 1995, Issue 1, pages 10 to 14 and Issue 2, pages 24 to 27; P. Jung, B. Steiner: "Konzept eines CDMA-Mobilfunksystems mit gemeinsamer Detektion für die dritte Mobilfunkgeneration" [Concept of a third generation CDMA mobile radio system with joint detection], FIG. 3 shows a possible FDMA/TDMA/CDMA multiple access for the uplink path (uplink; "mobile station→base station" transmission direction) and downlink path (uplink; "mobile station→base station" transmission direction) of a telecommunications system with CDMA, FDMA and TDMA multiple-access components, for example a Joint Detection CMDA mobile radio concept, in which—as in the GSM system (see FIG. 1)—the data are transmitted using the FDD principle in the uplink path or uplink direction (uplink; "mobile station→base station" transmission) and in the downlink path or downlink direction (downlink; "base station→mobile station" transmission) in different frequency bands.

The number of simultaneously active subscribers in one timeslot is, for example, K=8.

Figure 4:
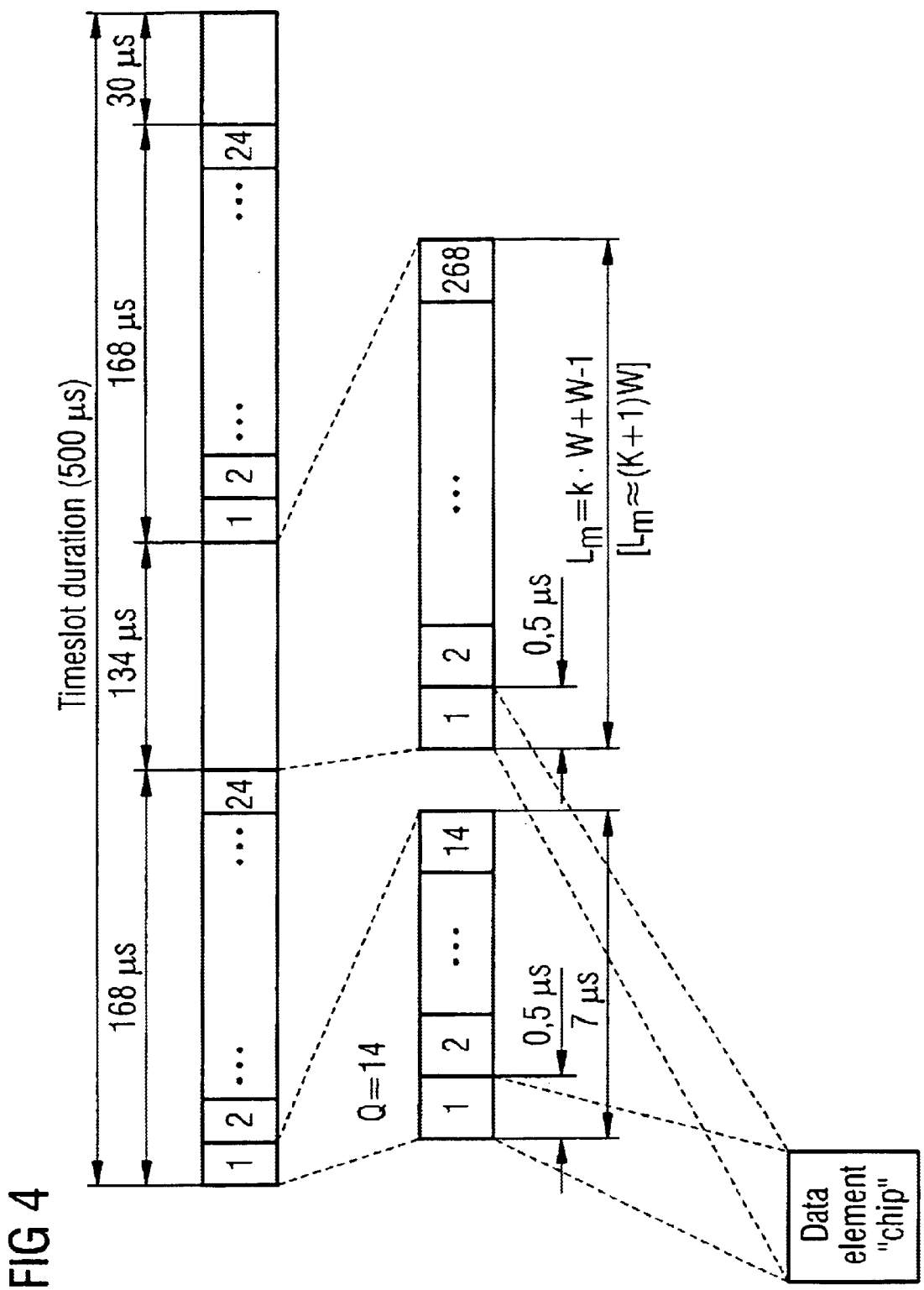

Based on the illustration of multiple access in FIG. 3, FIG. 4 shows the timeslot structure (burst structure) for the uplink path (up link; "mobile part→base station" transmission direction) for the Joint Detection CDMA mobile radio concept, which is known from the document *Nachrichtentechnik Elektronik* [*Electronics information technology*], Berlin 45, 1995, Issue 1, pages 10 to 14 and Issue 2, pages 24 to 27; P. Jung, B. Steiner: "Konzept eines CMDA-Mobilfunksystems mit gemeinsamer Detektion für die dritte Mobilfunkgeneration" [Concept of a third-generation CDMA mobile radio system with joint detection] and is illustrated, in particular, in FIG. 5 of that document.

The 24 user datablock data symbols shown in FIG. 4 are spread using a subscriber-specific spread code with a spreading factor of Q=14, so that each data symbol 14 contains data elements in the form of "chips".

Figure 5:
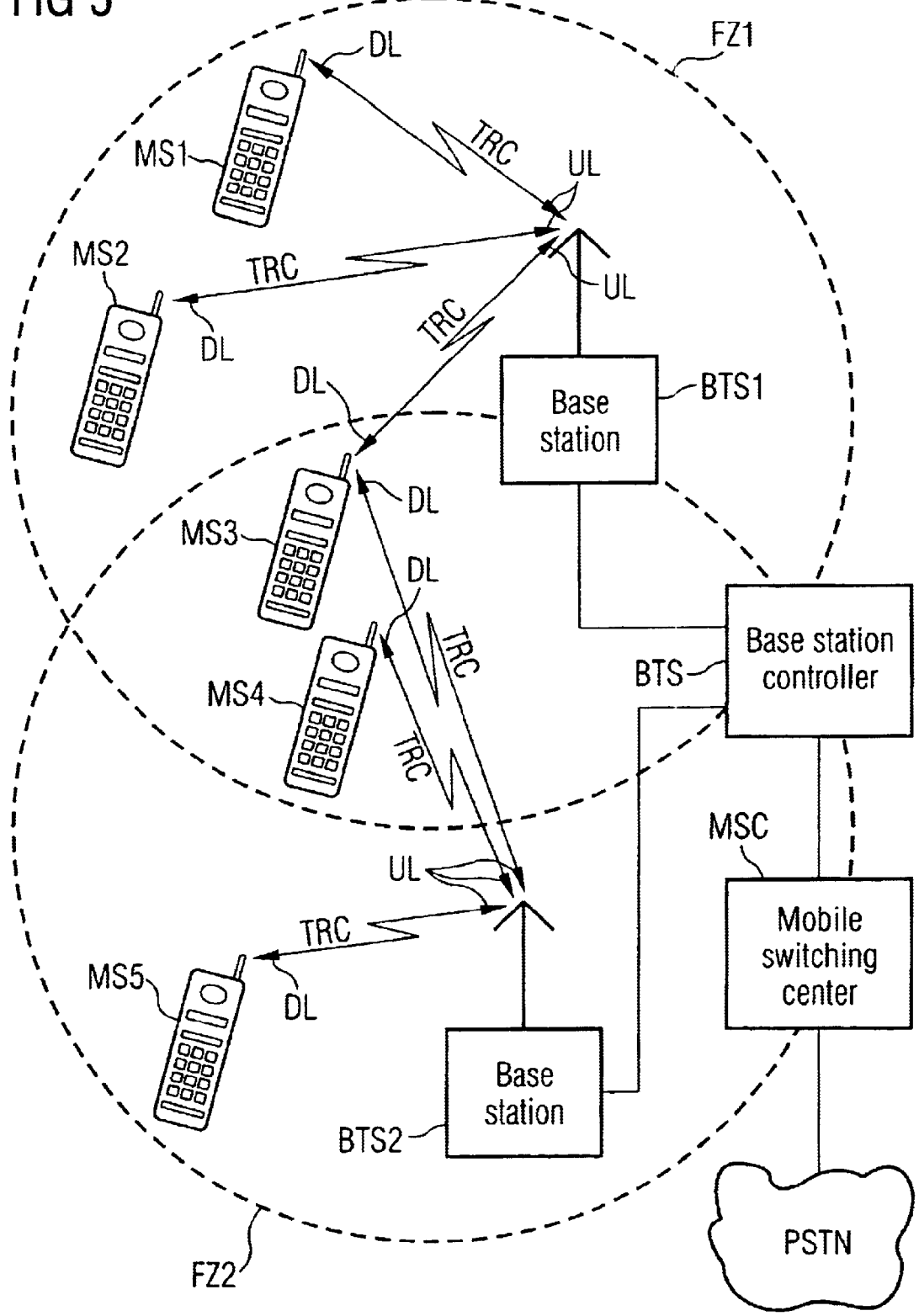

Based on a GSM radio scenario with, for example, two radio cells and base stations (Base Transceiver Station) arranged in them, in which case a first base station BTS1 (transmitter/receiver) "illuminates" a first radio cell FZ1 and a second base station BTS2 (transmitter/receiver) "illuminates" a second radio cell FZ2, omnidirectionally, FIG. 5 shows an FDMA/TDMA/CDMA radio scenario in which the base stations BTS1, BTS2 are connected or can be connected via a radio interface, which is designed for the FDMA/TDMA/CDMA radio scenario, to a number of mobile stations MS1 . . . MS5 (transmitters/receivers) located in the radio cells FZ1, FZ2, via wire-free unidirectional or bidirectional—uplink direction UL (Up Link) and/or downlink direction DL (Down Link)—telecommunication on appropriate transmission channels TRC. The base stations BTS1, BTS2 are connected in a known manner (see the GSM telecommunications system) to a base station controller BSC (Base Station Controller), which carries out the frequency management and switching functions while controlling the base stations. For its part, the base station controller BSC is connected via a mobile switching center MSC (Mobile Switching Center) to the higher-level telecommunications network, for example to the PSTN (Public Switched Telecommunication Network). The mobile switching center MSC is the management center for the illustrated telecommunications system. It carries out all the call management and, using associated registers (not illustrated), the authentication of the telecommunications subscribers as well as position monitoring in the network.

The data rate which can be transmitted using a mobile station can be varied, according to the document "*Nachrichtentechnik Elektronik* [*Electronic Information Technology*], Berlin 45, 1995, Issue 1, Pages 10 to 14 and Issue 2, pages 24 to 27, see: in particular Issue 2, page 26, left-hand column, lines 4 to 8; P. Jung, B. Steiner: "Konzept eines CDMA-Mobilfunksystems mit gemeinsamer Detektion für die dritte Mobilfunkgeneration [Concept of a third generation CDMA mobile radio system with joint detection]" by a plurality of timeslots (multi-slot option) and/or a plurality of CDMA codes (multi-code option) being assigned to this subscriber.

The multi-slot option and the multi-code option have the following characteristics, from the point of view of the mobile station:

Multi-slot option (a maximum of 1 CDMA code per timeslot assigned to one subscriber):

Mobile Station as the Transmitter:

The requirements for linearity of the RF section are less stringent, as the transmitted signal has a virtually constant envelope.

As the assigned number of timeslots increases, this becomes ever closer to continuous transmission operation. If, for example, the mobile station is assigned all eight timeslots in a TDMA frame, then this is precisely the same situation as continuous transmission operation. This situation is advantageous from the EMC point of view.

Mobile Station as the Receiver:

It is necessary to detect all the time slots in which the mobile station has been assigned a CDMA code. A disadvantageous in this case is that there is a signal processing overhead with regard to the following: if the mobile station is assigned only a single CDMA code from, for example, eight "active" CDMA codes, eight are nevertheless detected, for example in the case of the "joint detection process". The data for the seven non-assigned codes are not processed further.

Multi-code option (more than one CDMA code per timeslot is assigned to one subscriber):

Mobile Station as the Transmitter:

The RF section is subject to stringent requirements, since the transmitted signal does not have a constant envelope.

Mobile Station as the Receiver:

There is a slight overhead for signal processing in the receiver. In the situation where the mobile station is assigned all the active CDMA codes in a timeslot, there is no overhead whatsoever.

The object on which the invention is based is to avoid the disadvantages discussed above when varying the data rates which can be transmitted, for example, by mobile stations in telecommunications systems for wire-free telecommunication, in particular having a CDMA, FDMA and TDMA multiple access component.

Based on the method for wire-free telecommunications defined in the precharacterizing clause of patent claim 1, this object is achieved by the features specified in the characterizing part of patent claim 1.

The idea on which the invention is based is to use the multi-code option in the downlink (transmission direction: "base station→mobile station") and to use the multi-slot option in the uplink (transmission direction: mobile station→base station").

According to claim 2, it is advantageous if more than one CDMA code per timeslot can be assigned in the downlink and a maximum of 1 CDMA code per timeslot can be assigned in each case in the uplink.

Further advantageous developments are specified in the dependent claims.

An exemplary embodiment of the invention will be explained with reference to FIG. 6.

Based on FIG. 5, FIG. 6 shows a modified FDMA/TDMA/CDMA radio scenario, in which more than one CDMA code is assigned, for example per timeslot, in the downlink path (downlink) "base station BTS1, BTS2→mobile station MT1 . . . MT5" of the transmission channel TRC of the mobile station MT1 . . . MT5, while a plurality of time slots, for example a maximum of 1 CDMA code per timeslot in each case, are assigned to the mobile station MT1 . . . MT5 in the uplink path (uplink) "mobile station MT1 . . . MT5→base station BTS1 . . . BTS2" of the transmission channel TRC. Telecommunications system for wire-free telecommunication having a CDMA, FDMA and TDMA multiple access component The known multi-code option is used in the downlink (transmission direction: "base station→mobile station") and the known multi-slot option is used in the uplink (transmission direction: "mobile station→base station") for the telecommunications system.

What is claimed is:

1. A method for wire-free telecommunication having a CDMA, FDMA and TDMA multiple access component comprising the steps of:

subdividing each of individual frequencies in predetermined frequency bands into a number of timeslots, each of said timeslots having a predetermined timeslot duration;

simultaneous setting up telecommunications connections by a predetermined number of telecommunications subscribers in each of said frequency bands;

linking each subscriber signal of subscriber signals which are transmitted unidirectionally or bidirectionally, in an uplink connection or a downlink connection, in order to be able to separate them, to one individually assigned code; and assigning a plurality of timeslots or a plurality of codes to a respective telecommunications subscriber, wherein said plurality of codes are assigned to one of said telecommunications subscribers for said downlink connection, and said plurality of timeslots are assigned to one of said telecommunications subscribers for said uplink connection.

2. The method as claimed in claim 1, further comprising the steps of assigning a maximum of one code per timeslot to each said telecommunications subscriber for said uplink connection; and assigning more than one code per timeslot to said telecommunications subscriber for said downlink connection.

3. The method as claimed in claim 1, wherein said number of timeslots is eight time slots and said predetermined time slot duration is approximately 577 is.

4. The method as claimed in claim 1, wherein said predetermined number of telecommunications subscribers is eight.

\* \* \* \* \*